(12) United States Patent
Cierniak et al.

(10) Patent No.: US 6,289,504 B1
(45) Date of Patent: *Sep. 11, 2001

(54) CODE IMPLANTS FOR COMPILERS

(75) Inventors: Michael J. Cierniak; Roy P. D'Souza, both of Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,732

(22) Filed: Jun. 12, 2000

Related U.S. Application Data

(63) Continuation of application No. 09/119,840, filed on Jul. 21, 1998, now Pat. No. 6,131,191.

(51) Int. Cl.[7] .................................................. G06F 9/45
(52) U.S. Cl. ............................................ 717/5; 717/10
(58) Field of Search ................................... 717/1–3, 5–10; 709/305, 331, 332; 707/206, 103, 104

(56) References Cited

U.S. PATENT DOCUMENTS

| 5,761,513 | 6/1998 | Yellin et al. ......................... 395/705 |
| 5,845,298 | 12/1998 | O'Connor et al. .................... 707/206 |
| 5,848,423 | 12/1998 | Ebrahim et al. ...................... 707/206 |
| 5,857,210 | 1/1999 | Tremblay et al. .................... 707/206 |
| 5,873,104 | 2/1999 | Tremblay et al. .................... 707/206 |
| 5,903,899 | 5/1999 | Steele, Jr. ............................. 707/206 |
| 6,131,191 | * 10/2000 | Cierniak et al. ......................... 717/10 |

OTHER PUBLICATIONS

Hsieh, C.A., et al., "Optimizing NET Compilers for Improved Java Performance", *IEEE*, No. 0018–9162/97, 67–75, (Jun. 1997).

Jones, R., et al., "Garbage Collection: Algorithms for Automatic Dynamic Memory Mangement", *John Wiley & Sons*, 4 pages, (1996).

* cited by examiner

*Primary Examiner*—Kakali Chaki
(74) *Attorney, Agent, or Firm*—Schwegman, Lundberg, Woessner & Kluth, P.A.

(57) ABSTRACT

Code implants for compilers are disclosed. In one embodiment of the invention, a computerized system includes a virtual machine, a module within the virtual machine and providing a predetermined functionality, and a compiler. The compiler is desirably a just-in-time compiler, and compiles a first code (such as byte code in the case of the Java programming language) into a second code, which is desirably machine code. The compiler calls the module during compilation to receive a code implant associated with the module for inclusion into the second code.

9 Claims, 1 Drawing Sheet

CODE IMPLANTS FOR COMPILERS

This application is a continuation of U.S. Ser. No. 09/119,840, filed Jul. 21, 1998, now U.S. Pat. No. 6,131,191.

FIELD OF THE INVENTION

This invention relates generally to compilers for computers, and more particularly to code implants for such compilers.

BACKGROUND OF THE INVENTION

Traditionally, computer programs are written in a computer programming language such that the programs are specific to a particular type of computer. For example, a program written in the computer programming language C++ for the Microsoft™ WindowS™ operating system is usually not able to also run on a computer in which the Apple™ MacOS™ operating system is installed. This means that computer programmers must write different versions of their programs for each different type of computer on which the programs are desired to be run.

With the advent of more universal programming languages such as Java, however, programs may be written such that ideally they can be run on any type of computer. For example, a program written in Java ideally is able to run on a computer on which the Microsoft™ Windows™ operating system is installed, as well as on a computer on which the Apple™ MacOS™ operating system is installed. The computer programmer is not forced to rewrite the program for each different type of computer on which the program is desired to be run.

One manner by which programming languages such as Java provide for this write-once-run-anywhere capability is to have a two-step compilation process. A computer program is written in source code by a computer programmer, and is first compiled from source code to an intermediate code, which is known as byte code in the case of Java. When the program is run on a specific computer, a just-in-time compiler then compiles the byte code to machine code that the specific computer understands.

Furthermore, this machine code is executed on the specific computer in conjunction with a run-time system known as a virtual machine, which acts as an intermediary between the computer program and the operating system installed on the specific computer. However, the just-in-time compiler, in compiling the byte code to machine code, may need to ensure that various conditions and operations of the code (i.e., such as which registers are being used by the code, and which are unused) are being properly reported to the virtual machine. That is, the just-in-time compiler typically needs to interact with the virtual machine on the specific computer.

Typically, this is accomplished by inserting a function call within the machine code to the virtual machine for execution when the computer program is run. For example, what are known in the art as garbage collection routines (i.e., specialized memory management routines) are usually implemented at the virtual machine, such that during execution the machine code may have to at times call a garbage collection routine to provide information the routine needs in the form of what is known in the art as a write barrier instruction. Frequently, however, this run-time function call within the machine code becomes a bottleneck, slowing down the execution of the computer program.

A limited solution to this problem is to have the just-in-time compiler be aware of the specific routines within a virtual machine, such that the compiler can itself insert code for the routines when compiling byte code to machine code, thus eliminating the need for inserting a run-time function call to the virtual machine. However, a disadvantage to this solution is that it is counter to the philosophy of write-once-run-anywhere capability. If the specific routines change, without a corresponding change to the code inserted by the compiler, then the resulting machine code into which the incorrect code is inserted may not operate when the program is executed. That is, this limited solution trades flexibility for speed of execution. These and other disadvantages are addressed by the present invention.

SUMMARY OF THE INVENTION

The invention relates to code implants for compilers. In one embodiment of the invention, a computerized system includes a virtual machine, a module within the virtual machine, and a compiler. The module within the virtual machine provides a predetermined functionality (for example, in one particular embodiment, garbage collection). The compiler is desirably a just-in-time compiler, and compiles a first code (for example, in one particular embodiment, byte code in the case of the Java programming language) into a second code, (for example, in one particular embodiment, machine code). The compiler calls the module within the virtual machine during compilation to receive a code implant associated with the module for inclusion into the second code. In addition to this embodiment, the invention includes other embodiments, including computerized systems, methods, computers, and computer-readable media of varying scope.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
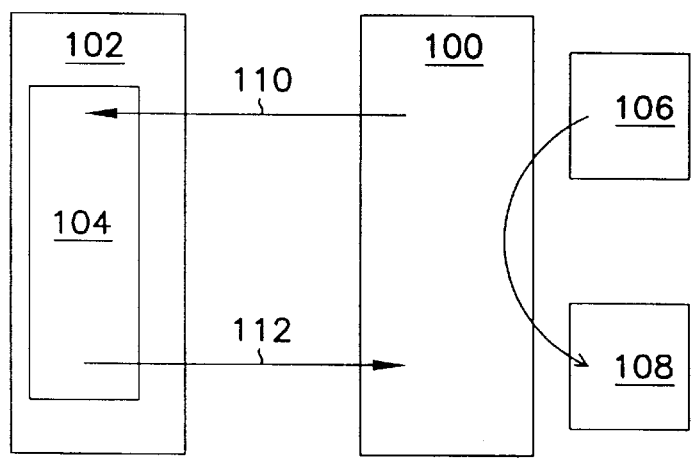
FIG. 1 shows a block diagram of a computerized system in accordance with an embodiment of the invention.

An overview of the invention is provided first. The overview is provided by reference to both a computerized system according to an embodiment of the invention, and a computerized method according to an embodiment of the invention. Referring first to FIG. 1, a block diagram of a computerized system in accordance with an embodiment of the invention is shown. The computerized system includes a just-in-time compiler 100, a virtual machine 102, and a module 104 within the virtual machine 102. The just-in-time compiler 100 compiles a first code 106 of a computer program to a second code 108 of the computer program. The just-in-time compiler 100 is just in time in the sense that it compiles the byte code 106 to the machine code 108 as is necessary for the execution of the computer program.

In the context of the Java programming language, the first code 106 is an intermediate code known as byte code, which was previously compiled from a source code of a computer program (not shown in FIG. 1). Also in the context of Java, the second code 108 is known as machine code, which includes the actual instructions understandable by the computerized system on which the computer program is executed. Those of ordinary skill within the art will appreciate that the invention is not limited to the Java programming language, however.

The virtual machine 102 is the run-time system of the computerized system that acts as the intermediary between the computer program and an operating system of the computerized system (not shown in FIG. 1). The virtual machine 102 thus is one manner by which computer programs may be executed on different types of computerized systems (e.g., having different operating systems) without forcing the computer programmer to rewrite the program specific to each type of computerized system or operating system in conjunction with which the program is desired to be run. In one embodiment of the invention, the virtual machine 102 is a Java virtual machine (JVM), as known within the art, although the invention is not so limited.

The module 104 within the virtual machine 102 provides a predetermined functionality, and thus may be implemented as a collection of routines made up of code. The invention is not limited to any particular type of predetermined functionality. However, in one embodiment of the invention, the predetermined functionality is garbage collection, a specialized memory management routine, as those of ordinary skill within the art can appreciate.

During the compilation of the first code 106 to the second code 108, the just-in-time compiler 100 may have to generate the second code 108 such that during the second code's execution it reports various conditions and operations of the code, such as the registers being used by the code and the registers that are unused, to the module 104 of the virtual machine 102. This is accomplished during compilation by the just-in-time compiler 100 calling the module 104, as represented by arrow 110, to receive from the module 104 a code implant associated with the module for inclusion into the second code 108, as represented by arrow 112, and that is known as a write barrier instruction.

Thus, the second code 108 includes specific implanted code as generated by the module 104, that is specific to the module 104. This provides the invention with advantages not found in the prior art. At run-time, the second code 108 executes the implanted code to report to the module 104 various conditions and operations of the code, without having to resort to a function call to the module 104. This provides for fast execution at run-time. In addition, should module 104 change, execution of the second code 108 is not affected: during run-time compilation, the just-in-time compiler 100 would again call the (changed) module 104, such that a new code implant would be received and inserted into the second code 108. This provides for flexibility in compatibility with the module 104 within the virtual machine 102.

Figure 2:
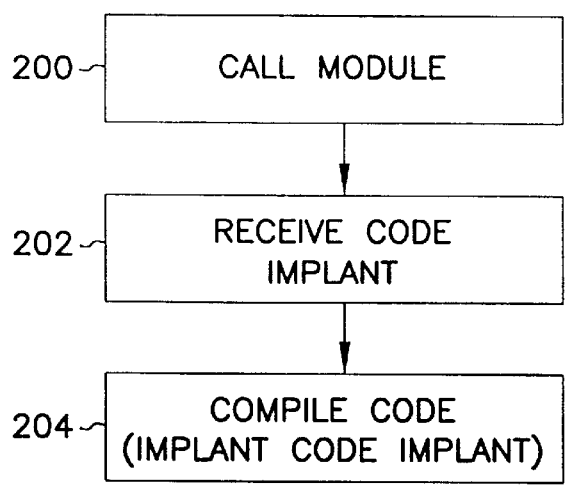
FIG. 2 shows a flowchart of a computerized method in accordance with an embodiment of the invention; and, FIG. 3 shows a diagram of a computer in conjunction with which embodiments of the invention may be practiced.

Referring next to FIG. 2, a flowchart of a computerized method in accordance with an embodiment of the invention is shown. The computerized method is desirably realized as a compiler program running on a computer—that is, as a program executed from a computer-readable medium such as a memory by a processor of a computer. The program is desirably storable on a computer-readable medium such as a floppy disk or a CD-ROM, for distribution, and installation and execution on another (suitably equipped) computer. The method of FIG. 2 is specifically the manner by which first (e.g., intermediary) code is compiled into second (e.g., machine) code by a compiler, according to an embodiment of the invention.

In step 200, the compiler, such as a just-in-time compiler, calls a module within a virtual machine regarding a desired code implant. That is, the just-in-time compiler, when realizing that various conditions and operations of the resulting machine code, such as which registers are being used and which are unused, need to be reported by the code to the virtual machine, calls the module within the virtual machine to provide a code implant that performs this reporting function. The module itself provides a predetermined functionality, such as garbage collection, a specialized memory management function known within the art. In the case of garbage collection, the code implant implements a write barrier instruction.

In step 202, the just-in time compiler receives from the module the desired code implant. The code implant is thus associated with the module, and performs the desired function as requested by the just-in-time compiler (for example, a reporting function). The code implant itself is generated by the module, and is desirably specific to the module.

Finally, in step 204, the compiler compiles the intermediary code into the machine code, inserting into the second code the code implant received from the module. Insertion of the code implant into the machine code means that execution of the machine code at run-time executes the code implant itself. Thus, the function of the code implant is accomplished without resorting to a function call to the virtual machine, which may slow execution of the machine code, while retaining flexibility: if the module changes, the code implant generated by the module and inserted into the machine code correspondingly changes as well.

An overview of the invention has been provided. The invention provides for interaction between a compiler, such as a just-in-time compiler, and a virtual machine (i.e., a run-time system) by having the compiler call a module within the virtual machine to receive a code implant associated with the module for insertion into the machine code generated by the compiler. This provides for both speed and flexibility not found in the prior art. First, the just-in-time compiler calls a module within the virtual machine during machine code generation, such that a run-time function call to the machine during execution of the machine code is not necessary. This speeds up execution of the resulting machine code. Second, the code inserted by the just-in-time compiler into the machine code is received from the module itself, such that if the module changes, the compiler still inserts the correct code into the machine code. This retains the flexibility of write-once-run-anywhere programming languages such as Java.

A more specific embodiment of the invention is now described, in a manner that will be understood particularly by those of ordinary skill within the art. In particular, this specific embodiment of the invention relates to a garbage collection module within a Java virtual machine called by a just-in-time compiler in compiling byte (intermediary) code to machine code, in the context of the Java programming language. Those of ordinary skill within the art can appreciate, however, that the invention is not limited to this specific embodiment, and that this specific embodiment is provided only for exemplary and illustrative purposes as a representative embodiment of the invention.

Garbage collection is a function provided by a module within a virtual machine to "clean up" after a computer program as it is executed on a computer. For example, a computer program may require memory within the computer for its execution. As this memory is given up by the computer program, such that it is no longer needed by the program, the garbage collection module ensures that this memory is made available for reuse by the program, or for use by other computer programs. Algorithms implementing garbage collection are known within the art, such as the card-marking garbage collection algorithm and the generational garbage collection algorithm. Such garbage collection algorithms, as well as other garbage collection algorithms, are specifically described in Richard Jones and Rafael Lins, *Garbage Collection: Algorithms for Automatic Dynamic Memory Management* (John Wiley & Sons, 1996).

In a specific embodiment, the conditions and operations of the machine code reported to the Java virtual machine include compile-time information such as: which registers contain information that the virtual machine will use; which values are compile-time constants and therefore do not have to be passed explicitly at run-time; which registers are used by the machine code already generated by the just-in-time compiler and are better left unchanged; and, which registers are not used by the code generated by the just-in-time compiler and therefore can be freely used in the implanted code without any overhead to save and restore them.

The code implant in this specific embodiment implements a write barrier. A write barrier is a section of code that needs to be executed before any write operation to an object stored in a heap is performed, as those of ordinary skill within the art can appreciate. The just-in-time compiler, when realizing that a write barrier is necessary, specifies to the garbage collection module within the Java virtual machine the following information: which registers contain a reference of the object; what the offset of the field being written to is; which registers hold other pertinent information; and, which registers are unused at this point of the machine code.

A pseudo-code declaration of this call by the just-in-time compiler to the garbage collection module within the Java virtual machine is represented as:

```
struct Code_Implant {
    // Which registers are being modified by the code
    // sequence
    Registers_Bit_Mask modified_regs;
    // List of patches that must be applied to the
    // inserted code. Patches are needed for code
    // relocation.
    JIT_Patch *patch_list;
    // The code sequence is generated into this
    // variable-sized array.
    Byte array code[];
}; //Code_Implant
Code_Implant *emit_write_barrier
    (Register address_reg,
    unsigned offset,
    Register_Bit_Mask live_regs
);
```

The garbage collection module within the virtual machine returns the following information to the just-in-time compiler: the machine code sequence with the custom implementation of the write barrier (i.e., the code implant); information regarding which registers have had their old values overwritten by the write barrier code; and, relocation information for the write barrier code (if needed). The code generated by emit_write_barrier thus performs a write barrier assuming that the address of the object written to is contained in the register identified by the address_reg argument. The offset of the field written to is in the offset argument. Registers that contain live values are identified in the live_regs argument. The code is returned in the Code_Implant structure that, in addition to the code itself (in the code array), contains information about which registers have actually been modified by this code sequence (in the modified_regs field), and contains information necessary to relocate the code sequence in memory (in the JIT_Patch field).

As an example, in the case of a card-marking garbage collection module, a write barrier would set a flag corresponding to a card associated with a particular field. A call to the garbage collection module by the just-in-time compiler may take the form Code_Implant *ci=emit_write_barrier(ECX, 16, EBP|EBX|ESI), where the register ECX holds an object reference, the field offset is 16, and the compiler uses registers EBP, EBX, and ESI to hold useful data. Thus, the card marking write barrier may appear as:

EAX, dword ptr [ECX+16]

shr EAX, 8 mov byte ptr [EAX+base], 0

The Code_Implant return value would contain this sequence and the information that the register EAX was modified. No patches are needed for this code if it is relocated.

As another example, in the case of a generational garbage collection module, a write barrier may be implemented as an operation of adding the information about the write operation to a write notice list. This may require a longer sequence of operations that is best implemented as a function call. A call to the garbage collection module by the just-in-time compiler may still take the form Code_Implant *ci=emit_write_barrier(ECX, 16, EBP|EBX|ESI), where the register ECX holds an object reference, the field offset is 16, and the compiler uses registers EBP, EBX, and ESI to hold useful data. The generational garbage collection module may return a Code_Implant value that includes the code sequence:

push EAX push 16 call G_WBarrier

Thus, function calls still may be present in the code implant generated by the module within the virtual machine. The code implant would also include relocation information for the address of the GC_WBarrier function and would indicate that the registers EAC, ECX, EBX and EDX are modified by the write barrier function. In this example, the garbage collection module would ignore the information from the compiler that the value in EBX is live; the compiler would thus have to perform some operations to preserve or recompute this value.

A specific embodiment of the invention has been described. This specific embodiment relates to a garbage collection module within a Java virtual machine, as it interacts with a just-in-time compiler compiling Java byte code to machine code. Two representative examples were specifically presented: one relating to a card-marking garbage collection module, and another relating to a generational garbage collection module.

Figure 3:
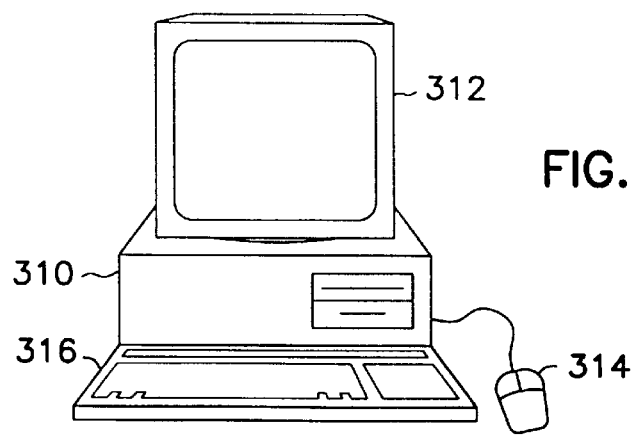

A representative computer, in conjunction with which embodiments of the invention may be practiced, is now described. Those of ordinary skill within the art can appreciate, however, that the invention is not limited to implementation in conjunction with this computer. Referring to FIG. 3, a diagram of the computer in conjunction with which embodiments of the invention may be practiced is shown. Computer 310 is operatively coupled to monitor 312, pointing device 314, and keyboard 316. Computer 310 includes a processor (desirably, an Intel™ Pentium™ processor), random-access memory (RAM) (desirably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310. Computer 310 desirably is a PC-compatible computer, running a version of the Microsoft™ Windows™ operating system. The construction and operation of such computers are well known within the art.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems such as versions of Microsoft™ Windows™. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

A description of a computer in conjunction with which embodiments of the invention may be practiced has been provided. The computer desirably includes a monitor, a pointing device, and a keyboard. The invention is not limited to the described computer, however.

In the detailed description, code implants for compilers have been described. In one embodiment of the invention, a computerized system includes a virtual machine, a module within the virtual machine and providing a predetermined functionality, and a compiler. The compiler is desirably a just-in-time compiler, and compiles a first code (such as byte code in the case of the Java programming language) into a second code, which is desirably machine code. The compiler calls the module during compilation to receive a code implant associated with the module for inclusion into the second code.

For example, in an embodiment for Java, a just-in-time compiler may be aware that certain conditions and operations of a computer program (such as the registers being used by the program, and those that are unused) must be reported to a garbage collection routine (i.e., a specialized memory management routine) residing within a virtual machine. Therefore, while compiling byte code of the program to machine code, the compiler calls the garbage collection routine, which returns to the compiler specific code for implanting into the machine code (known as a write barrier instruction). Thus, the implanted code becomes part of the machine code that is executed by the computer on which the computer program is running.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

We claim:

1. A machine-readable medium with compiler instructions thereon, the compiler instructions when executed operable to cause a computerized system to:

compile a first code into a second code, the compiler instructions calling a module within a virtual machine during compilation of the first code into the second code to receive a code implant associated with the module for inclusion into the second code.

2. The machine-readable medium of claim 1, wherein the virtual machine comprises a Java virtual machine.

3. The machine-readable medium of claim 1, wherein the module within the virtual machine provides a predetermined functionality.

4. The machine-readable medium of claim 3, wherein the predetermined functionality is garbage collection.

5. The machine-readable medium of claim 1, wherein the first code comprises byte code.

6. The machine-readable medium of claim 1, wherein the second code comprises machine code.

7. The machine-readable medium of claim 1, wherein the compiler comprises adjust-in-time compiler.

8. The machine-readable medium of claim 1, wherein the code implant includes information regarding registers.

9. A machine-readable medium with compiler instructions thereon, the compiler instructions when executed operable to cause a computerized system to:

call a module within a virtual machine during a compilation to receive a code implant associated with the module for inclusion into a compiled code.

* * * * *